US010139023B2

(12) United States Patent
Slavens et al.

(10) Patent No.: US 10,139,023 B2
(45) Date of Patent: Nov. 27, 2018

(54) ADVANCED BRAZE JOINT FOR TUBE-TO-TUBE CONNECTION

(71) Applicant: United Technologies Corporation, Hartford, CT (US)

(72) Inventors: Thomas N. Slavens, Moodus, CT (US); Carey Clum, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 411 days.

(21) Appl. No.: 14/992,646

(22) Filed: Jan. 11, 2016

(65) Prior Publication Data

US 2017/0198838 A1    Jul. 13, 2017

(51) Int. Cl.
*F01D 9/06* (2006.01)
*F16L 13/02* (2006.01)
(Continued)

(52) U.S. Cl.
CPC ........ *F16L 13/0209* (2013.01); *B23K 1/0018* (2013.01); *B23K 1/18* (2013.01);
(Continued)

(58) Field of Classification Search
CPC .......... F01D 9/06; F16L 13/08; B23K 1/0018; B23K 33/006; Y10T 403/47;
(Continued)

(56) References Cited

U.S. PATENT DOCUMENTS 1,877,433 A * 9/1932 Ten Brook .............. F16L 13/08
                                                        285/133.11
5,253,946 A * 10/1993 Watkins ................ E21B 17/023
                                                        403/265
(Continued)

FOREIGN PATENT DOCUMENTS

FR    2 952 713    *  5/2001   ............. G01G 11/00
FR    2 862 338    *  5/2005   ............. F01D 9/02
(Continued)

OTHER PUBLICATIONS

European Patent Office, European Search Report dated Apr. 10, 2017 in Application No. 17150564.7-1702.

*Primary Examiner* — Michael P Ferguson
(74) *Attorney, Agent, or Firm* — Snell & Wilmer L.L.P.

(57) ABSTRACT

Systems for tube-to-tube connections are described herein. A device having an aperture for receiving a tube may comprise: an inlet portion comprising a first diameter, the inlet portion located at an inlet of the aperture; a braze filler collector portion located axially adjacent to the inlet portion comprising a second diameter, the second diameter being greater than the first diameter; a necked portion located axially adjacent to the braze filler collector portion comprising a third diameter, the third diameter being less than the first diameter and the second diameter; a flow surface comprising a fourth diameter, the fourth diameter being less than the third diameter, the flow surface defining a void; and a collection pocket located axially adjacent to the necked portion, the collection pocket configured to collect a braze filler material from the necked portion to prevent the braze filler material from contacting the flow surface.

13 Claims, 4 Drawing Sheets

(51) Int. Cl.
| | |
|---|---|
| *B23K 1/00* | (2006.01) |
| *B23K 1/19* | (2006.01) |
| *F02C 3/04* | (2006.01) |
| *B23K 33/00* | (2006.01) |
| *B23K 1/18* | (2006.01) |
| *B23K 101/06* | (2006.01) |
| *B23K 103/04* | (2006.01) |
| *B23K 103/08* | (2006.01) |
| *B23K 101/00* | (2006.01) |

(52) U.S. Cl.
CPC .............. *B23K 1/19* (2013.01); *B23K 33/006* (2013.01); *F01D 9/06* (2013.01); *F02C 3/04* (2013.01); *B23K 2101/001* (2018.08); *B23K 2101/06* (2018.08); *B23K 2103/05* (2018.08); *B23K 2103/08* (2018.08); *F05D 2220/32* (2013.01); *F05D 2230/237* (2013.01)

(58) Field of Classification Search
CPC ............. Y10T 403/473; Y10T 403/475; Y10T 403/477; Y10T 403/478
See application file for complete search history.

(56) References Cited

U.S. PATENT DOCUMENTS

| | | | |
|---|---|---|---|
| 2014/0182292 A1* | 7/2014 | Hudon | F01D 21/003 60/722 |
| 2014/0219778 A1 | 8/2014 | Boeke et al. | |
| 2014/0260263 A1* | 9/2014 | Farrell | F01D 9/06 9/6 |

FOREIGN PATENT DOCUMENTS

| | | | | |
|---|---|---|---|---|
| GB | 2 452 026 | * | 2/2009 | ............. F01D 17/02 |
| JP | 09236188 | | 9/1997 | |
| WO | WO 2010/132658 | * | 11/2010 | ............. E21B 43/00 |

* cited by examiner

ADVANCED BRAZE JOINT FOR TUBE-TO-TUBE CONNECTION

FIELD

This disclosure relates generally to gas turbine engines, and more particularly to a female fitting of a tube-to-tube joint.

BACKGROUND

Tube-to-tube connections may be adjoined via various methods including via a brazing process. Generally, a braze filler material (filler metal) is applied between a first and a second tube to adjoin the two tubes. As the braze filler material is heated, the braze filler material may unavoidably enter into a flow cavity or surface of the tubes which may clog or otherwise affect the flow surface of the tubes.

SUMMARY

Systems for tube connections via a brazing process are described herein, in accordance with various embodiments. A device having an aperture for receiving a tube may comprise: an inlet portion comprising a first diameter, the inlet portion located at an inlet of the aperture; a braze filler collector portion located axially adjacent to the inlet portion comprising a second diameter, the second diameter being greater than the first diameter; a necked portion located axially adjacent to the braze filler collector portion comprising a third diameter, the third diameter being less than the first diameter and the second diameter; a flow surface comprising a fourth diameter, the fourth diameter being less than the third diameter, the flow surface defining a void; and a collection pocket located axially adjacent to the necked portion, the collection pocket configured to collect a braze filler material from the necked portion to prevent the braze filler material from contacting the flow surface.

In various embodiments, at least a portion of at least one of the inlet portion, the braze filler collector portion, the necked portion, or the void comprise a cylindrical geometry. The braze filler collector portion may be located axially between the inlet portion and the necked portion. The device may further comprise a stopping surface located proximate the collection pocket, the stopping surface being substantially perpendicular to a center axis of the flow surface and configured to contact a tube in response to the tube having been fully inserted into the aperture. At least one of the inlet portion, the braze filler collector portion, the necked portion, or the collection pocket may define a junction surface, the junction surface configured to be coupled to the tube via the braze filler material. A length of the junction surface may be between 125% and 400% of the first diameter. The length of the junction surface may be between 150% and 200% of the first diameter. The third diameter may be between 75% and 98% of the first diameter. The third diameter may be between 80% and 90% of the first diameter.

A vane platform assembly may comprise: a vane coupled between an inside diameter (ID) platform and an outside diameter (OD) platform; and a first aperture. The first aperture may comprise: an inlet portion comprising a first diameter, the inlet portion located at an inlet of the first aperture; a braze filler collector portion, located axially adjacent to the inlet portion, comprising a second diameter, the second diameter being greater than the first diameter; a necked portion, located axially adjacent to the braze past collector portion, comprising a third diameter, the third diameter being less than the first diameter and the second diameter; a flow surface comprising a fourth diameter, the fourth diameter being less than the third diameter, the flow surface defining a void; and a collection pocket located axially adjacent to the necked portion, the collection pocket configured to collect a braze filler material from the necked portion and prevent the braze filler material from contacting the flow surface.

In various embodiments, the vane platform assembly may further comprise a second aperture in fluidic communication with the first aperture. The second aperture may comprise a pressure tap. The vane platform assembly may further comprise a tube, wherein the first aperture circumferentially surrounds at least a portion of the tube, the first aperture configured to receive the tube. The first aperture may be disposed in at least one of the OD platform or the ID platform. The second aperture may be disposed in at least one of the vane, the ID platform, or the OD platform.

A tube-to-tube connection may comprise: a first tube; and a second tube including an aperture configured to receive the first tube. The aperture may comprise: an inlet portion comprising a first diameter, the inlet portion located at an inlet of the aperture; a braze filler collector portion located axially adjacent to the inlet portion comprising a second diameter, the second diameter being greater than the first diameter; a necked portion located axially adjacent to the braze filler collector portion comprising a third diameter, the third diameter being less than the first diameter and the second diameter; a flow surface comprising a fourth diameter, the fourth diameter being less than the third diameter; and a collection pocket located axially adjacent to the necked portion, the collection pocket configured to collect a braze filler material from the necked portion to prevent the braze filler material from contacting the flow surface.

In various embodiments, the braze filler collector portion may be located axially between the inlet portion and the necked portion. The first tube may comprise an inside diameter (ID) surface comprising a diameter being equal to the fourth diameter. A gap between an outside diameter (OD) surface of the first tube and the necked portion may be configured to prevent a braze filler material from flowing within the gap. At least one of the inlet portion, the braze filler collector portion, the necked portion, or the collection pocket may define a junction surface, the junction surface circumferentially surrounding an end of the first tube, the junction surface coupled to the first tube via the braze filler material located between the junction surface and an outside diameter (OD) surface of the first tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
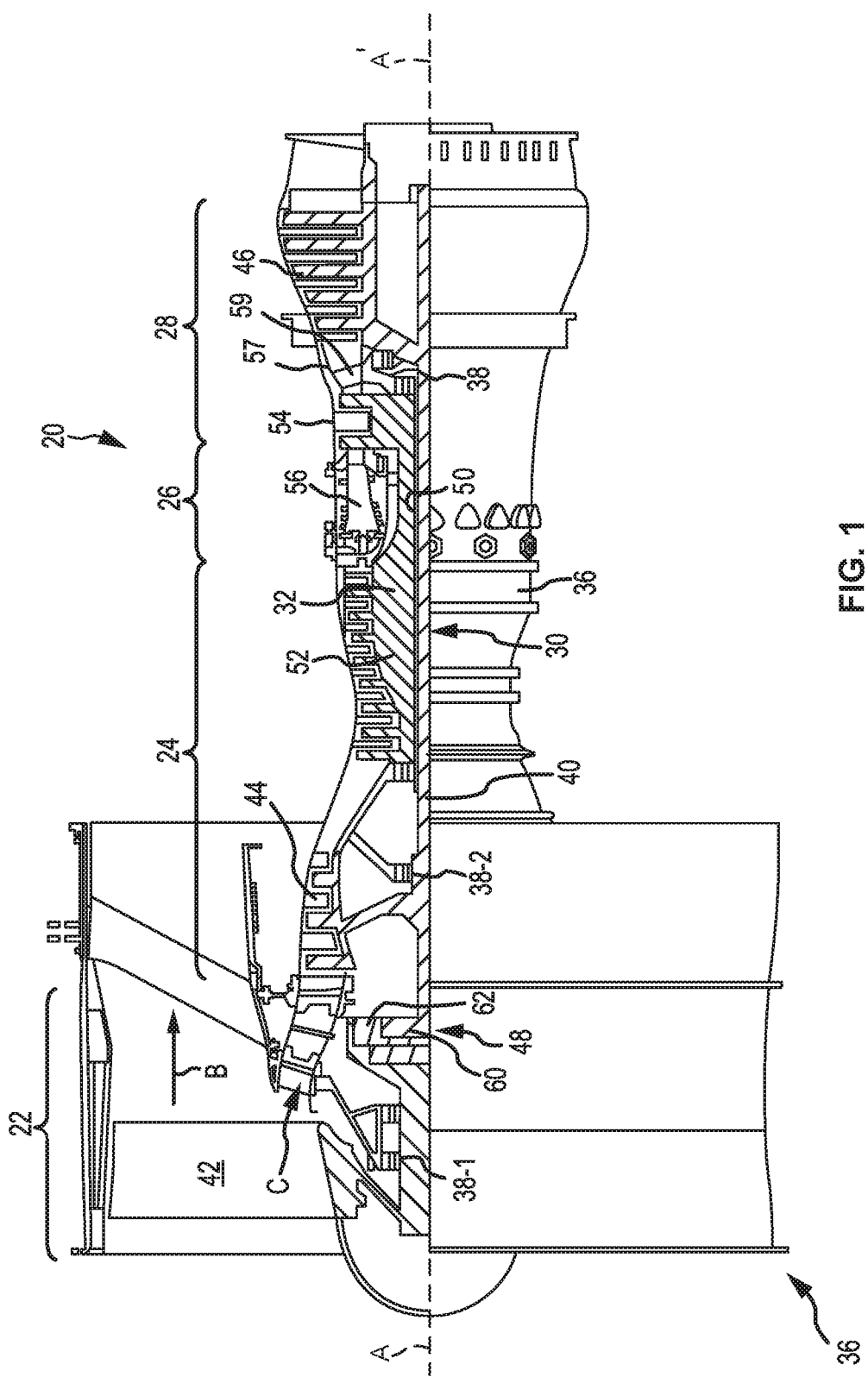
FIG. 1 illustrates an example gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Brazing is a metal joining process in which two or more metal devices are joined together by melting and flowing a braze filler material, the braze filler material having a lower melting point than the adjoining metal. A braze filler material may be applied between two or more metal devices and heat may be applied to the joint via a hand held torch. However, heat may be applied via any method. The joint is generally heated until the braze filler material melts, the two or more devices remaining in an un-melted state, whereinafter the braze filler material is left to cool, joining the two or more devices. The melting and resolidification of the braze filler material could also include chemical re-alloying of the paste giving it a higher melting temperature in the processed state. As described herein, a tube-to-tube connection may be adjoined via a brazing process. In various embodiments, a braze filler material may comprise a paste, a powder, or a solid material.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of gas turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 (e.g., a second compressor section) and high pressure (or second) turbine section ("HPT") 54. A combustor 56 may be located between high pressure compressor 52 and HPT 54. A mid-turbine frame 57 of engine static structure 36 may be located generally between HPT 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over HPT 54 and low pressure turbine 46. Mid-turbine frame 57 includes airfoils 59 which are in the core airflow path. Low pressure turbine 46 and HPT 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

Figure 2:
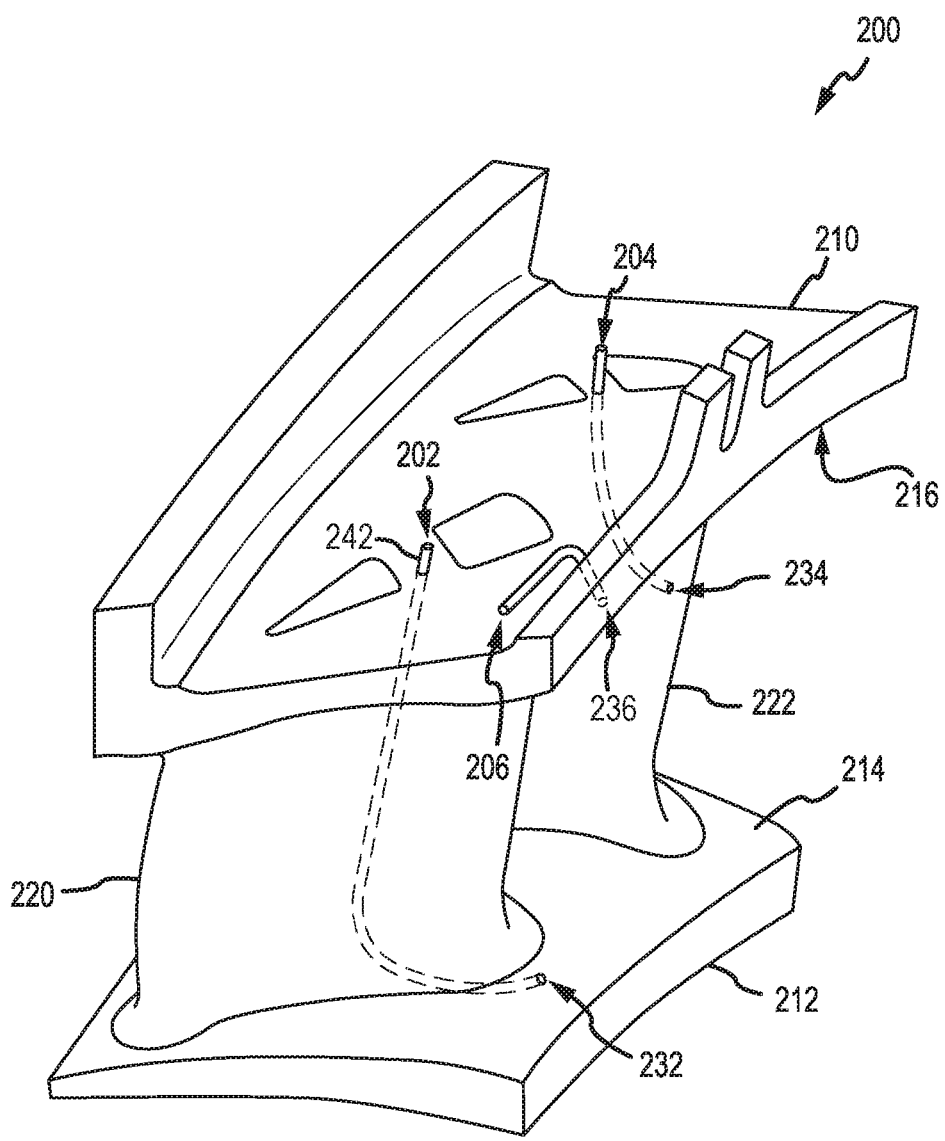
FIG. 2 illustrates a perspective view of a vane platform assembly with pressure taps, in accordance with various embodiments.

With reference to FIG. 2, a vane platform assembly 200 is illustrated, in accordance with various embodiments. Vane platform assembly 200 may comprise a first platform (also referred to herein as outside diameter (OD) platform) 210, a second platform (also referred to herein as inside diameter (ID) platform) 212, and one or more vanes, such as first vane 220 and second vane 222, for example. First vane 220 and second vane 222 may be coupled between OD platform 210 and ID platform 212.

In various embodiments, OD platform 210 may comprise one or more pressure taps such as first pressure tap 202, second pressure tap 204, and/or third pressure tap 206. First pressure tap 202 may comprise an aperture 232 disposed in inner flow surface 214 of ID platform 212. Second pressure tap 204 may comprise an aperture 234 disposed in second vane 222. Third pressure tap 206 may comprise an aperture 236 disposed in outer flow surface 216 of OD platform 210. Accordingly, first pressure tap 202 may comprise an inside diameter (ID) pressure tap, second pressure tap 204 may comprise an airfoil pressure tap, and third pressure tap 206 may comprise an outside diameter (OD) pressure tap. First pressure tap 202 may be configured to measure a fluid pressure located at aperture 232. Second pressure tap 204 may be configured to measure a fluid pressure located at aperture 234. Third pressure tap 206 may be configured to measure a fluid pressure located at aperture 236. In various embodiments, aperture 232, aperture 234, and/or aperture 236 may be referred to herein as a second aperture.

In various embodiments, first pressure tap 202 may comprise a tube 242 extending from vane platform assembly 200. Tube 242 may be configured to be joined with a second tube by inserting the second tube into tube 242 and brazing the two tubes together. In this regard, second pressure tap 204 and third pressure tap 206 may be similar to first pressure tap 202. As described herein, in various embodiments, tube 242 may comprise a first aperture located at an inlet which is in fluidic communication with aperture 232.

Figure 3A:
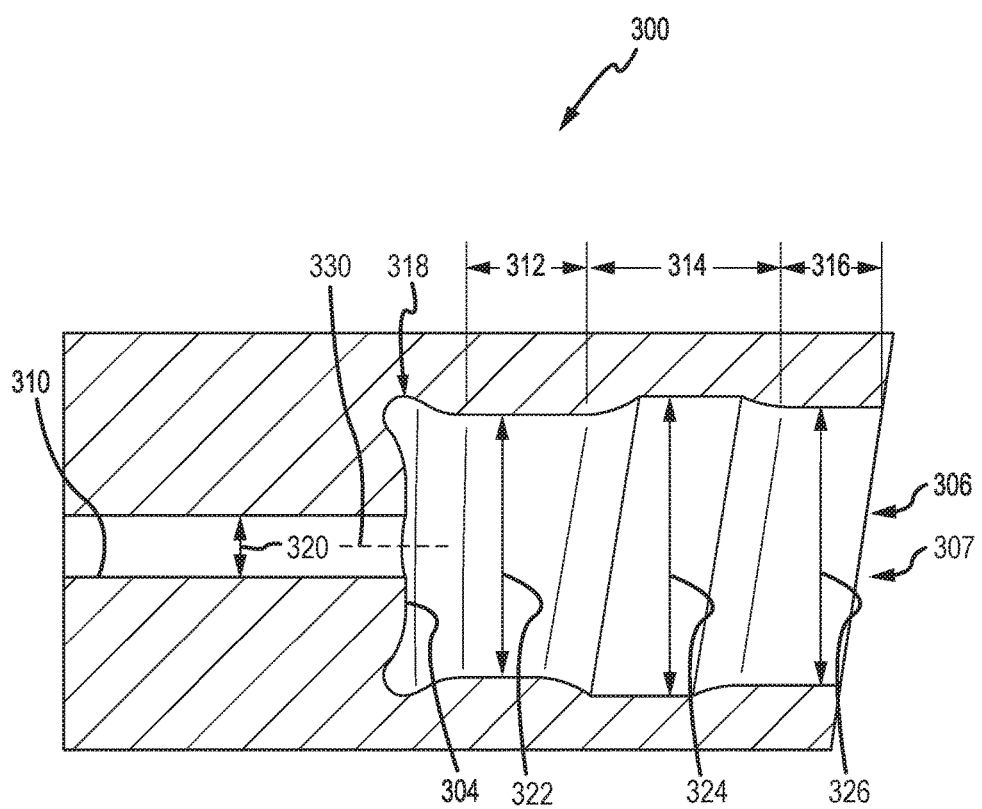
FIG. 3A illustrates a cross-section view of a device having an aperture configured to receive a tube, in accordance with various embodiments.

With reference to FIG. 3A, a device 300 having an aperture (also referred to herein as first aperture) 307 for receiving a tube is illustrated, in accordance with various embodiments. In various embodiments, device 300 may comprise a pressure tap such as first pressure tap 202 for example (see FIG. 2). In various embodiments, device 300 may comprise an inlet 306, an inlet portion 316, a braze filler collector portion 314, and a necked portion 312. In various embodiments, device 300 may comprise a collection pocket 318 and a flow surface 310.

In various embodiments, inlet portion 316 may be located at or in close proximity to inlet 306. Inlet 306 may be the opening or otherwise the location of insertion of a tube into aperture 307. Thus, aperture 307 may include inlet 306, inlet portion 316, braze filler collector portion 314, necked portion 312, and/or collection pocket 318. Inlet portion 316 may comprise a first diameter 326. Braze filler collector portion 314 may comprise a second diameter 324. Second diameter 324 may be greater than first diameter 326. Braze filler collector portion 314 may be located axially between inlet portion 316 and necked portion 312. Accordingly, braze filler collector portion 314 may be located axially adjacent to inlet portion 316. Similarly, necked portion 312 may be located axially adjacent to braze filler collector portion 314.

Necked portion 312 may comprise a third diameter 322. Third diameter 322 may be less than first diameter 326. Third diameter 322 may be less than second diameter 324. Flow surface 310 may comprise a fourth diameter 320. Fourth diameter 320 may be less than third diameter 322. Flow surface 310 may define a cylindrical void. Flow surface 310 may comprise a cylindrical geometry. Inlet portion 316 may comprise a cylindrical geometry. Braze filler collector portion 314 may comprise a cylindrical geometry. Necked portion 312 may comprise a cylindrical geometry.

In various embodiments, collection pocket 318 may be located axially adjacent to necked portion 312. Collection pocket 318 may be configured to collect a braze filler material from necked portion 312. Collection pocket 318 may prevent braze filler material from contacting or otherwise altering flow surface 310. In various embodiments, collection pocket 318 may comprise a flare as illustrated. However, it is contemplated that collection pocket 318 may comprise any suitable geometry such as a counter-sunk chamfer or a groove for example. However, collection pocket 318 may comprise any suitable geometry. In various embodiments, device 300 may comprise a stopping surface 304. Stopping surface 304 may be located in close proximity to collection pocket 318, the stopping surface 304 being substantially perpendicular to center axis 330 of flow surface 310. Stopping surface 304 may be configured to contact a tube in response to the tube having been fully inserted into aperture 307.

Figure 3B:
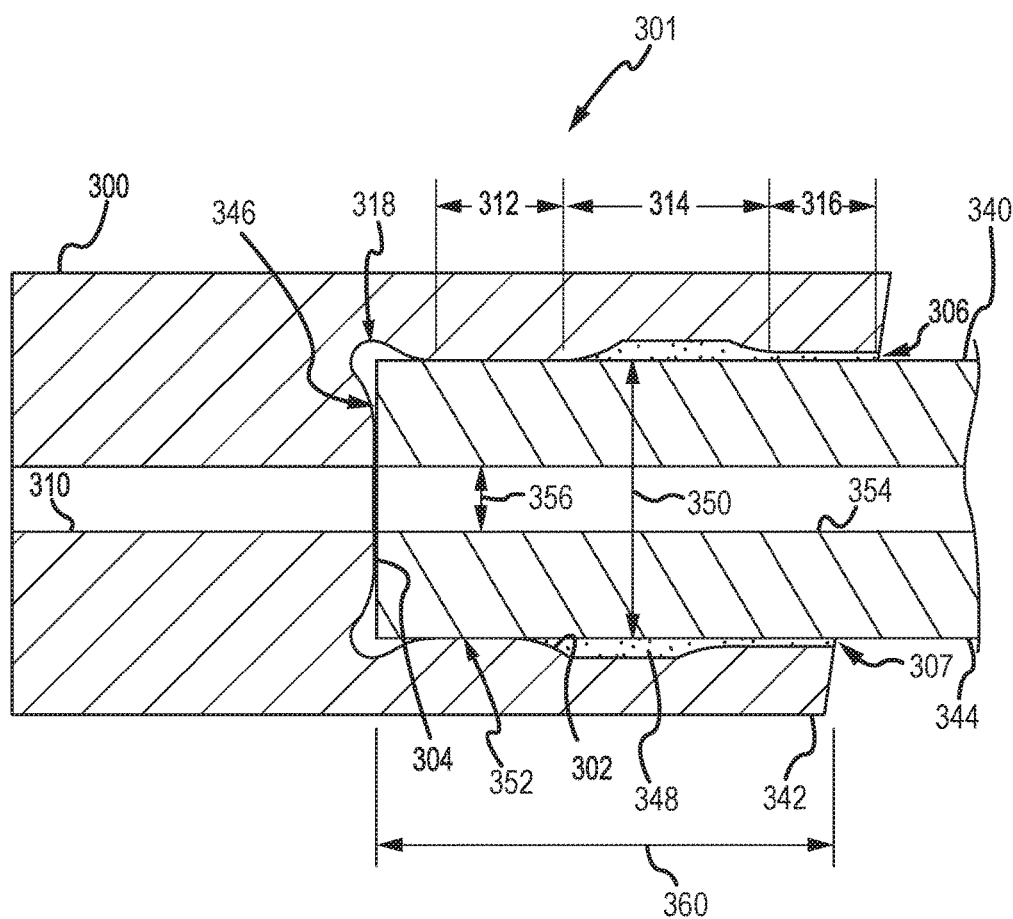
FIG. 3B illustrates a cross-section view of a tube-to-tube connection, in accordance with various embodiments.

With respect to FIG. 3B, elements with like element numbering, as depicted in FIG. 3A, are intended to be the same and will not necessarily be repeated for the sake of clarity.

With reference to FIG. 3B, a cross-section view of a tube-to-tube connection 301 is illustrated, in accordance with various embodiments. Tube-to-tube connection 301 may comprise a first tube 340 and a second tube 342. Second tube 342 may comprise device 300 as illustrated in FIG. 3A. First tube 340 may be inserted into aperture 307 of second tube 342. In various embodiments, a braze filler material 348 may be applied to outside diameter (OD) surface 344 of first tube 340 before first tube 340 is inserted into aperture 307. In various embodiments, a braze filler material 348 may be applied to inlet portion 316 and braze filler collector portion 314 of second tube 342 before first tube 340 is inserted into aperture 307. First tube 340 may comprise an outside diameter 350. Outside diameter 350 may be less than third diameter 322 (see FIG. 3A). However, outside diameter 250 may be configured to be only slightly less than third diameter 322 to decrease the gap 352 between OD surface 344 and necked portion 312. Accordingly, necked portion 312 may be configured to prevent a braze filler material from moving from braze filler collector portion 314 and entering collection pocket 318. Stated another way, gap 352 may be configured to prevent the flow of a braze filler material within gap 352. In various embodiments, first tube 340 may comprise an inside diameter (ID) surface 354. ID surface 354 may comprise a diameter 356. In various embodiments, diameter 356 may be equal to fourth diameter 320 (see FIG. 3A).

In various embodiments, at least one of inlet portion 316, braze filler collector portion 314, necked portion 312, and collection pocket 318 may define a junction surface 302. First tube 340 may be coupled to junction surface 302 via braze filler material 348. In this regard, first tube 340 may be adjoined to second tube 342 via a brazing process, wherein first tube 340 is adjoined to second tube 342 via braze filler material 348. In various embodiments, braze filler material 348 may comprise a metal filler, the metal filler comprising a melting point temperature which is less than the melting point temperature of first tube 340 and second tube 342.

In various embodiments, first tube 340 may contact stopping surface 304 in response to first tube 340 being inserted completely into aperture 307. Stated another way, first tube 340 may contact stopping surface 304 when first tube 340 is in an installed position. Second tube 342 may circumferentially surround at least a portion of first tube 340 when first tube 340 is in an installed position.

In various embodiments, junction surface 302 may comprise a length 360. With reference to FIG. 3A and FIG. 3B, length 360 may be between 125% and 400% of first diameter 326, in accordance with various embodiments. Third diameter 322 may be between 75% and 98% of first diameter 326, in accordance with various embodiments. Third diameter 322 may be between 80% and 90% of first diameter 326, in accordance with various embodiments.

In various embodiments, first tube 340 and second tube 342 may comprise a high temperature metal (e.g., an austenitic nickel-chromium-based alloy such as that available under the trade name INCONEL), a high temperature composite, and/or the like. In various embodiments, first tube 340 and second tube 342 may comprise a high temperature stainless steel (e.g., type 330 stainless steel).

Although described herein with respect to vane platform assemblies, devices, and tube-to-tube connections, as described herein, may be used with any other suitable connection such as secondary air system tube joints, internal heat exchanger assemblies, and fuel system connections (i.e., fuel ring connections, internal fuel nozzles, etc), for example.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A device having an aperture for receiving a tube, the aperture comprising:
    an inlet portion comprising a first diameter, the inlet portion located at an inlet of the aperture;
    a braze filler collector portion located axially adjacent to and coaxial with the inlet portion, comprising a second diameter, the second diameter being greater than the first diameter;
    a necked portion located axially adjacent to and coaxial with the braze filler collector portion, the necked portion configured to contact the tube and comprising a third diameter, the third diameter being less than the first diameter and the second diameter, wherein the braze filler collector portion is located axially between the inlet portion and the necked portion;
    a flow surface configured to convey a fluid between the device and the tube, the flow surface comprising a fourth diameter, the fourth diameter being less than the third diameter;
    a stopping surface adjacent to the flow surface and substantially perpendicular to a center axis of the flow surface, the stopping surface configured to contact the tube in response to the tube having been fully inserted into the aperture; and
    a collection pocket located between and coaxial with the necked portion and the stopping surface, the collection pocket configured to collect a braze filler material from the necked portion to prevent the braze filler material from contacting the flow surface,
    wherein at least one of the inlet portion, the braze filler collector portion, the necked portion and the collection pocket define a junction surface configured to be coupled to the tube via the braze filler material.

2. The device of claim 1, wherein at least a portion of at least one of the inlet portion, the braze filler collector portion, the necked portion, or the void comprise a cylindrical geometry.

3. The device of claim 1, wherein a length of the junction surface is between 125% and 400% of the first diameter.

4. The device of claim 3, wherein the length of the junction surface is between 150% and 200% of the first diameter.

5. The device of claim 1, wherein the third diameter is between 75% and 98% of the first diameter.

6. The device of claim 5, wherein the third diameter is between 80% and 90% of the first diameter.

7. A vane platform assembly comprising:
a vane coupled between an inside diameter (ID) platform and an outside diameter (OD) platform; and
a tube disposed in the OD platform, the tube including a first aperture configured to receive a second tube, the first aperture comprising:
an inlet portion comprising a first diameter, the inlet portion located at an inlet of the first aperture;
a braze filler collector portion, located adjacent to and coaxial with the inlet portion, comprising a second diameter, the second diameter being greater than the first diameter;
a necked portion, located axially adjacent to and coaxial with the braze filler collector portion, the necked portion configured to contact the second tube and comprising a third diameter, the third diameter being less than the first diameter and the second diameter, wherein the braze filler collector portion is located axially between the inlet portion and the necked portion;
a flow surface configured to convey a fluid through at least a portion of the vane platform assembly, the flow surface comprising a fourth diameter, the fourth diameter being less than the third diameter;
a stopping surface adjacent to the flow surface and substantially perpendicular to a center axis of the flow surface, the stopping surface configured to contact the second tube in response to the tube having been fully inserted into the aperture; and
a collection pocket located between and coaxial with the necked portion and the stopping surface, the collection pocket configured to collect a braze filler material from the necked portion and prevent the braze filler material from contacting the flow surface,
wherein at least one of the inlet portion, the braze filler collector portion, the necked portion and the collection pocket define a junction surface configured to be coupled to the second tube via the braze filler material.

8. The vane platform assembly of claim 7, further comprising a second aperture in one of the vane, the ID platform or the OD platform, the second aperture in fluidic communication with the first aperture via the tube.

9. The vane platform assembly of claim 8, wherein the second aperture comprises a pressure tap.

10. The vane platform assembly of claim 7, further comprising a second tube, wherein the first aperture circumferentially surrounds at least a portion of the second tube, the first aperture configured to receive the second tube.

11. A tube-to-tube connection comprising:
a first tube; and
a second tube including an aperture configured to receive the first tube, the aperture comprising:
an inlet portion comprising a first diameter, the inlet portion located at an inlet of the aperture;
a braze filler collector portion located axially adjacent to and coaxial with the inlet portion comprising a second diameter, the second diameter being greater than the first diameter;
a necked portion located axially adjacent to and coaxial with the braze filler collector portion, the necked portion configured to contact the first tube and comprising a third diameter, the third diameter being less than the first diameter and the second diameter, wherein the braze filler collector portion is located axially between the inlet portion and the necked portion;
a flow surface configured to convey a fluid between the first tube and the second tube, the flow surface comprising a fourth diameter, the fourth diameter being less than the third diameter;
a stopping surface adjacent to the flow surface and substantially perpendicular to a center axis of the flow surface, the stopping surface configured to contact the first tube in response to the first tube having been fully inserted into the aperture; and
a collection pocket located between and coaxial with the necked portion and the stopping surface, the collection pocket configured to collect a braze filler material from the necked portion to prevent the braze filler material from contacting the flow surface,
wherein at least one of the inlet portion, the braze filler collector portion, the necked portion and the collection pocket define a junction surface circumferentially surrounding an end of the first tube and coupled to the first tube via the braze filler material located between the junction surface and an outside diameter (OD) surface of the first tube.

12. The tube-to-tube connection of claim 11, wherein the first tube comprises an inside diameter (ID) surface comprising a diameter being equal to the fourth diameter.

13. The tube-to-tube connection of claim 11, wherein a gap between an outside diameter (OD) surface of the first tube and the necked portion is configured to prevent a braze filler material from flowing within the gap.

* * * * *